(12) United States Patent
Hickey et al.

(10) Patent No.: US 6,763,387 B1
(45) Date of Patent: Jul. 13, 2004

(54) METHOD AND SYSTEM FOR SHARING A SINGLE COMMUNICATION PORT BETWEEN A PLURALITY OF SERVERS

(75) Inventors: James P. Hickey, Woodland, CA (US); Zamaneh Mowzooni, El Dorado Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 835 days.

(21) Appl. No.: 09/689,509

(22) Filed: Oct. 12, 2000

(51) Int. Cl.[7] .............................................. G06F 13/00
(52) U.S. Cl. ...................................... 709/226; 709/224
(58) Field of Search .............................. 709/200, 201, 709/208, 209, 210, 226, 227, 224, 223

(56) References Cited

U.S. PATENT DOCUMENTS 6,047,319 A * 4/2000 Olson ........................ 709/223
6,049,820 A   4/2000 Murphy, Jr. et al. ........ 709/203
6,609,159 B1 * 8/2003 Dukach et al. .............. 719/331
6,614,757 B1 * 9/2003 Rochberger et al. ........ 370/231
6,662,223 B1 * 12/2003 Zhang et al. ................ 709/224

* cited by examiner

Primary Examiner—Moustafa M. Meky

(57) ABSTRACT

A method and system for sharing a communication port between a plurality of servers through a communication mechanism. The method includes the steps of requesting access to the shared communication port by a first server, linking the first server to the shared communication port by the communication mechanism, requesting access to the shared communication port by at least one other server, linking the other server(s) to an available communication port by the communication mechanism, returning a status to the other server(s) indicating a link with the shared communication port by the communication mechanism, and accepting requests for the shared communication port by the first server.

9 Claims, 3 Drawing Sheets

METHOD AND SYSTEM FOR SHARING A SINGLE COMMUNICATION PORT BETWEEN A PLURALITY OF SERVERS

The present invention generally relates to an improved method and system for sharing a single communication port. More specifically, it relates to a method and system for sharing a communication port between a plurality of servers through a communication mechanism.

It is becoming more common for components, such as peripheral devices, to be equipped with their own servers. When a network device is connected to a peripheral device that has its own server, both devices are generally considered as one device with one Internet Protocol ("IP") address and one Uniform Resource Locator ("URL"). As a result, each of the devices uses the same IP address and default communication port, but there is no way to differentiate which of the devices is being requested by a particular requesting browser.

A prior method is to allow only one of the servers to be used for that particular communication port. In other words, a server must be selected in advance for the connection with that communication port. As a result, other servers are not recognized and do not provide any services to the network. One problem with the prior method is that, although two servers are available for servicing, only one server is selected, resulting in ineffective use of the other server. Alternatively, the other servers can use additional protocols that are mapped to other communication ports. A problem with using an additional protocol is that the server cannot use the default communication port. However, most requesting browsers are programmed to look for the default communication port. Consequently, some requests can fail if the requesting browser does not know to look for another protocol mapped to an alternative communication port and not the default communication port.

Accordingly, a primary object of the present invention is to provide an improved method and system for sharing a single shared communication port between a plurality of servers.

Another object of the present invention is to provide an improved method and system for sharing a single communication port that maps the servers to alternative available port.

Yet another object of the present invention is to provide an improved method and system for sharing a communication port that can service requests for multiple servers through a single shared communication ports.

A further object of the present invention is to provide an improved method and system for sharing a communication port that recognizes multiple servers on a single shared communication port.

Other objects, features and advantages will become apparent upon reading the detailed description set forth herein, in conjunction with the attached drawings.

BRIEF SUMMARY OF THE INVENTION

The present invention generally relates to an improved method and system for sharing a communication port. More specifically, it relates to a method and system for sharing a communication port between a plurality of servers through a communication mechanism.

The present invention provides an improved method and system for sharing a single communication port between a plurality of servers through a communication mechanism. The method includes the steps of requesting access to the shared communication port by a first server, connecting the first server to the shared communication port by the communication mechanism, requesting access to the shared communication port by at least one other server, mapping the other server(s) to an available communication port by the communication mechanism, returning a status indicating a connection to the shared communication port to the other server(s) by the communication mechanism, and accepting additional requests for the shared communication port by the first server.

DETAILED DESCRIPTION

Broadly stated, the present invention is directed to an improved method and system for sharing a single communication port between a plurality of servers. The present invention allows multiple servers to be recognized on a single communication port by allowing a first server to be linked with the shared communication port and mapping the remaining servers to alternative available ports. Although the servers are mapped to alternative available ports and not the shared port, a communication mechanism makes the servers think that they are linked to the shared port nevertheless. As a result, a single shared communication port can service requests for multiple servers.

Figure 1:
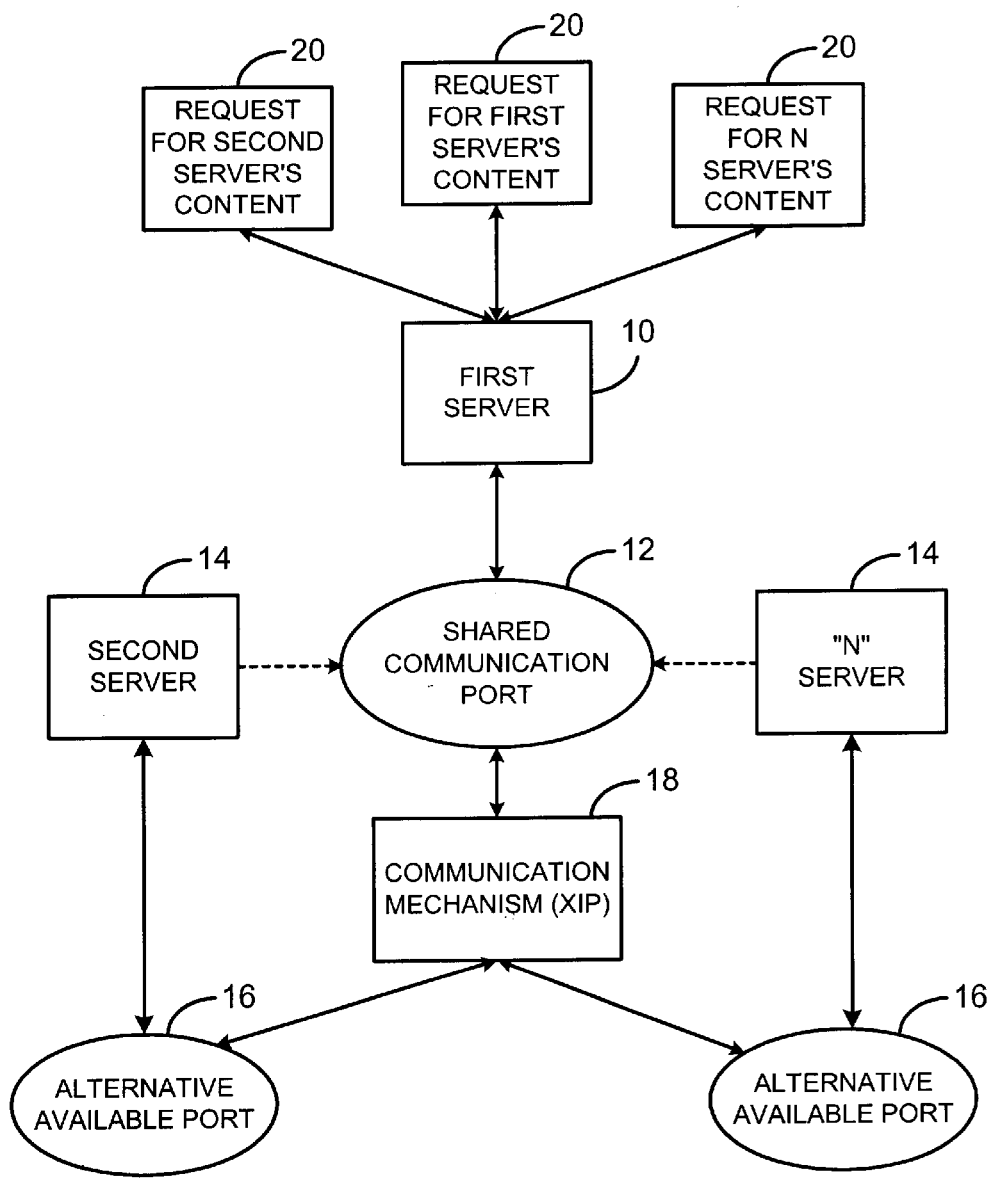
FIG. 1 is an exemplary diagram of a network system in which the present invention can be implemented.

Turning now to FIG. 1, an exemplary diagram of a network system is shown. A first server 10 is linked to a shared communication port 12, and two other servers 14 (i.e., a second server and a "N" server) sharing the same port are mapped to alternative available ports 16 through a communication mechanism 18, which will be referred to as XIP. The XIP 18 is very similar to a remote procedure call mechanism, which is a protocol that allows a program running on one host to cause code to be executed on another host without the programmer needing to explicitly code for this. Generally speaking, the XIP 18 is a protocol and a software program that is installed on all the servers 10, 14 utilizing the present invention. In addition, any number of servers 14 can be implemented for sharing of the same communication port 12. These other various implementations are contemplated and are within the scope of the present invention.

Although only the first server 10 is actually linked with the shared communication port, the communication mechanism makes the other servers 14 think that they are linked with the shared port, even though they are mapped to alternative available ports. Communications are exchanged between the servers 14 and the communication mechanism 18 via the alternative available ports. After the communication mechanism 18 receives the information from the servers 14, the requested information is forwarded to the first server 10 for responding to the requests 20. As shown, all the requests 20 for the multiple servers must travel through the first server 10, which routes the requests to the communication mechanism 18 for processing. A more detailed description of these processes will be explained in FIGS. 2 and 3.

Figure 2:
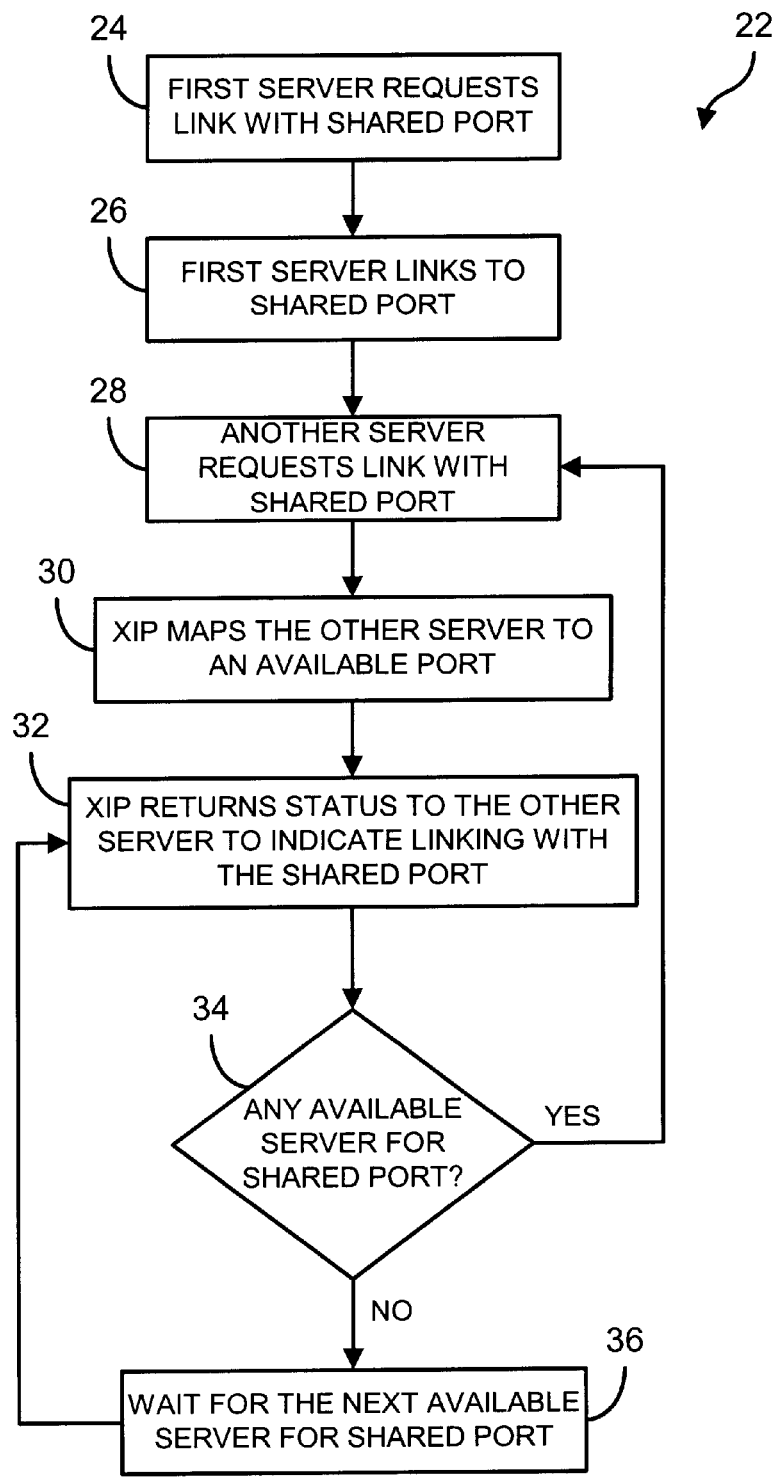
FIG. 2 is a flowchart of the linking process for the shared communication port; and, FIG. 3 is a flowchart of the request process for the shared communication port.

In FIG. 2, a flowchart of the linking process for the shared communication port is shown and indicated generally at 22.

A first server requests to link with a communication port that is to be shared in the system (block 24), which will be referred to as the "shared communication port". Since the first server is the first one to request to link with the shared communication port, the linking with the shared port is actually allowed (block 26). Then, when another server later requests to link with the same shared communication port (block 28), the XIP, the communication mechanism, responds by mapping this other server to an available communication port in the system (block 30).

Although the other server is actually mapped to another communication port and not the shared communication port, the XIP, nevertheless, returns a status to the other server to indicate a link with the shared communication port (block 32). As a result, the other server thinks that it is linked to the shared communication port. Next, the XIP determines whether there are any more servers requesting to be linked with the shared communication port (block 34). If so, the process loops back to the step of another server requesting to link with the shared communication port (block 28), and repeats the process again. Otherwise, since there are no more server requests for the shared port (block 34), the process waits until another server requests a link with the shared communication port (block 36).

Figure 3:
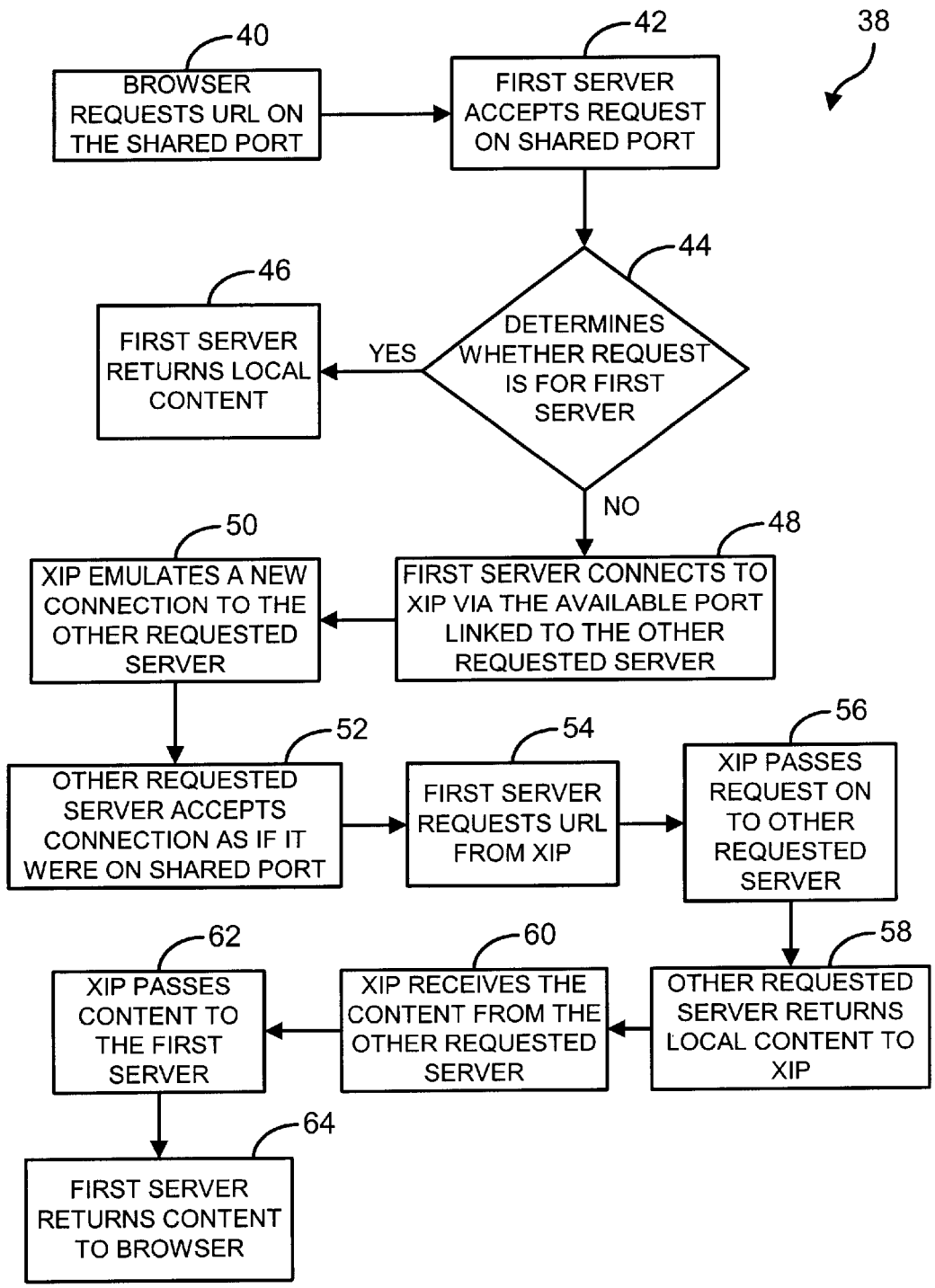

Referring now to FIG. 3, a flowchart of a request process of the shared communication port is shown and generally indicated at 38. A browser makes a request for a URL on the shared communication port (block 40), and the first server accepts the request (block 42). It should be noted that although a web connection is shown as an example, the present invention can be implemented with any kind of servers linked with any type of communication ports. These other implementations are contemplated and are within the scope of the present invention.

After the first server accepts the request on the shared communication port (block 42), the first server determines whether the request is actually for its own server or another server (block 44). If the request is for the first server (block 44), the first server simply returns its local content to the browser (block 46). Otherwise, the first server connects to the XIP via the communication port that was mapped to the other requested server in the linking process shown in FIG. 1 (block 48). The XIP next emulates a new connection to the other requested server (block 50), which it accepts as if the connection was on the shared communication port (block 52). The first server requests the URL from the XIP (block 54), and the XIP, in turn, passes the request on to the other requested server (block 56). The other requested server responds by returning its local content to the XIP (block 58), which is received by the XIP (block 60). The content is then passed to the first server by the XIP (block 62), which is finally returned to the browser (block 64).

From the foregoing description, it should be understood that an improved method and system for sharing a communication port between a plurality of servers has been shown and described, which has many desirable attributes and advantages. The method and system allows a plurality of servers to share a single communication port. Although only a first server is actually linked with the shared port, the other servers, nevertheless, think that it is linked to the shared port and responds accordingly. The other servers are, in fact, mapped to other alternative available ports by the communication mechanism. Consequently, communications are exchanged through the communication mechanism via these alternative ports. As a result, the shared communication port recognizes requests for multiple servers.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method for sharing a communication port between a plurality of servers through a communication mechanism, said method comprising the steps of:
    requesting access to said shared communication port by a first server;
    linking said first server to said shared communication port by said communication mechanism;
    requesting access to said shared communication port by at least one other server;
    mapping said at least one other server to an available communication port by said communication mechanism;
    returning a status to said at least one other server indicating a link with said shared communication port by said communication mechanism; and,
    accepting additional requests for said shared communication port by said first server.

2. The method according to claim 1 wherein said servers are web servers.

3. The method according to claim 1 wherein said shared communication port is a default communication port.

4. The method according to claim 1 wherein said accepting step further comprising the steps of:
    receiving a request for said shared communication port;
    determining whether said request is for said first server or said at least one other server;
    returning local content for said request by said first server if said request is for said first server; and,
    connecting to said communication mechanism using said available communication port mapped to said at least one other requested server if said request if for said at least one other server.

5. The method according to claim 4, wherein said connecting step further comprising the steps of:
    emulating a new connection to said at least one other requested server by said communication mechanism; and,
    accepting said new connection by said at least one other requested server.

6. The method according to claim 5 further comprising the steps of:
    requesting local content from said communication mechanism by said first server; and,
    passing said request to said at least one other requested server by said communication mechanism.

7. The method according to claim 6 further comprising the steps of:
    returning said local content to said communication mechanism by said at least one other requested server;
    receiving said local content from said at least one other requested server by said communication mechanism;
    passing said local content to said first server by said communication mechanism; and,
    returning said local content for said request by said first server.

8. A system for sharing a communication port between a plurality of servers through a communication mechanism, comprising:

means for requesting access to said shared communication port by a first server;

means for linking said server to said shared communication port by said communication mechanism;

means for requesting access to said shared communication port by at least one other server;

means for mapping said at least one other server to an available port by said communication mechanism;

means for returning a status to said at least one other server indicating a link with said shared communication port by said communication mechanism; and, means for accepting additional requests for said shared communication port by said first server.

9. A system for sharing a communication port between a plurality of servers through a communication mechanism, comprising:

a first server adapted to request access to said shared communication port;

a communication mechanism adapted to link said first server to said shared communication port; and, at least one other server adapted to request access to said shared communication port;

wherein said communication mechanism is adapted to map said at least one other server to an available communication port;

said communication mechanism is adapted to return status to said at least one other server indicating a link with said shared communication port;

said first server is adapted to accept additional requests for said shared communication port.

* * * * *